June 10, 1930.  W. L. LIGHTFORD  1,762,997
WHEEL CHOCK
Filed Jan. 5, 1927
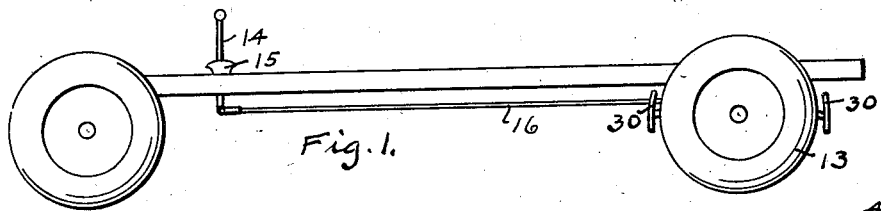
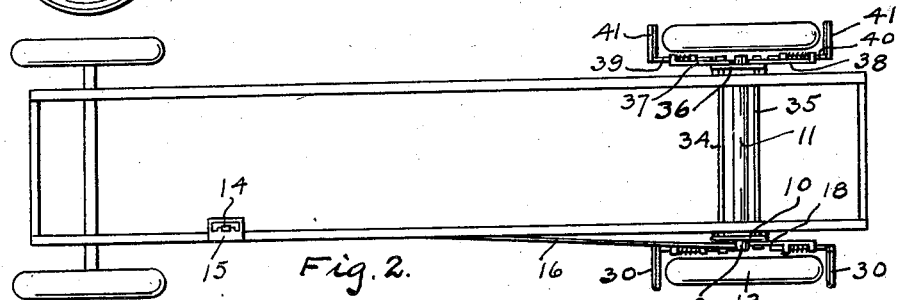
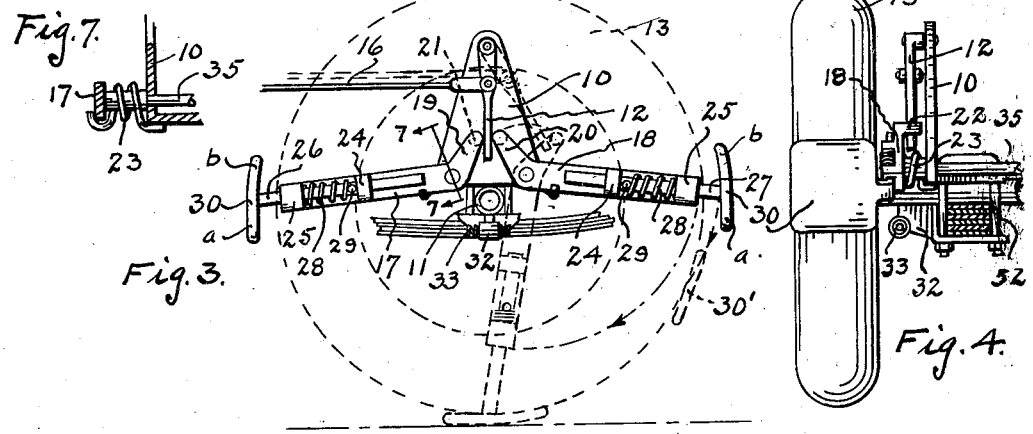
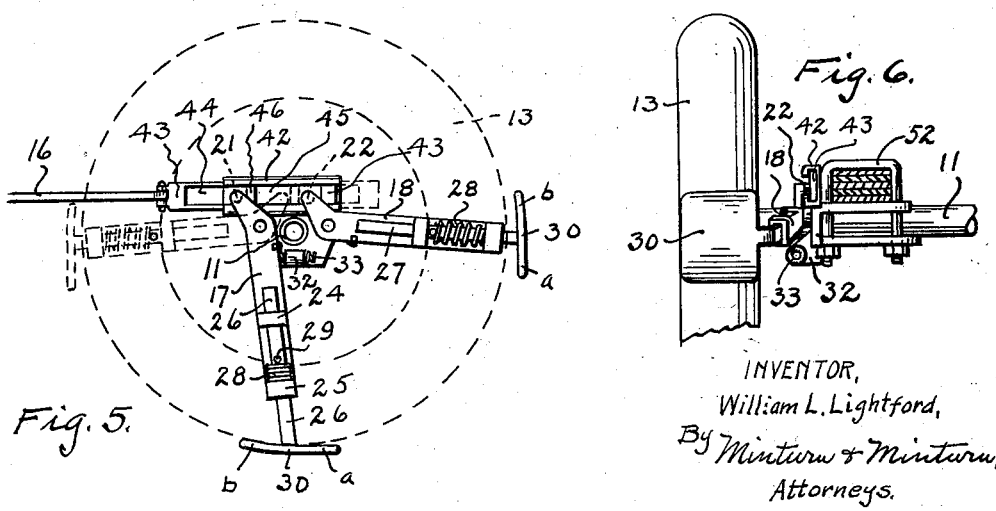
INVENTOR,
William L. Lightford,
By Minturn & Minturn,
Attorneys.

Patented June 10, 1930

1,762,997

UNITED STATES PATENT OFFICE

WILLIAM L. LIGHTFORD, OF INDIANAPOLIS, INDIANA

WHEEL CHOCK

Application filed January 5, 1927. Serial No. 159,081.

This invention relates in general to means for placing a chock under a moving wheel of a vehicle whereby the rotation of the wheel may be stopped and any further travel of the vehicle is arrested by the chock frictionally sliding over the roadway.

The invention is described in reference to the accompanying drawing, in which—

Fig. 1, is a side elevation of a stripped automobile chassis to which my invention is applied;

Fig. 2, a top plan view of the chassis;

Fig. 3, a side elevation of the chock actuating mechanism;

Fig. 4, a rear elevation of the chock actuating mechanism;

Fig. 5, a side elevation of a modified form of the chock actuating mechanism;

Fig. 6, a rear elevation of the modified form; and

Fig. 7, a section on the line 7—7 in Fig. 3.

Like characters of reference indicate like parts throughout the several views.

Referring particularly to Figs. 3 and 4, a vertical plate 10 is secured to the vehicle axle 11 by any suitable means such as the spring clip 52. A lever 12 is pivotally secured by its upper end to near the top of the plate 10 to swing freely fore and aft between the plate and the wheel 13 of the vehicle.

A control hand lever 14 is pivotally mounted on the vehicle at any convenient point and operates through a quadrant 15. A connecting rod 16 interconnects the hand lever 14 with the lever 12 at a point below its center of rotation so that a substantial length of the lever 12 extends downwardly from the point at which the rod 16 connects with it.

Two arms 17 and 18 are pivotally carried on the plate 10, one extending to the rear and the other forwardly. The arm 17 has a short upturned arm 19 projecting upwardly and rearwardly, and similarly, the arm 18 has a short arm 20 projecting upwardly and forwardly toward the arm 19. Pins 21 and 22 extend from the arms 19 and 20, one on either side of the lever 12 whereby any rocking of the lever 12 will rock either arm 17 or 18 as the lever 12 may be moved. It is to be noted that the arms 17 and 18 swing eccentrically with the travel of the wheel 13.

A torsion spring 23 tends to hold the arms 17 and 18 in the normal inoperative positions substantially horizontal as indicated by the solid lines in Fig. 3, whereby the pins 21 and 22 each contact the lever 12.

The long arms 17 and 18 each carry straps 24 and 25 which serve as retaining guides to slidably carry the extension legs 26 and 27, each of which legs are retained by means of the springs 28 bearing between a pin 29 through each leg and against the outer strap 25, whereby the legs may yieldingly be extended an appreciable distance.

A chock or shoe 30 is carried on the outer end of each leg 26 and 27, each shoe having a straight portion "a" below the leg, and an incurving portion "b" above the leg as viewed in Fig. 3.

In both Figs. 3 and 5, the wheel 13 has been removed to disclose the mechanism, and its relative position is indicated by dash lines.

Assuming the vehicle to be in some such position as in climbing a hill and the motive power fails, and the brakes fail to hold the vehicle from rolling backwardly down the hill, my invention then serves to great advantage. By pushing the hand lever 14 forwardly the lever 12 is rocked backwardly to contact the pin 22 so that the arm 18 is swung downwardly whereby in such travel the shoe 30 will contact the wheel tire in the position 30', and as the wheel is rolling backwardly, the shoe 30 will be carried by frictional engagement, down and under the wheel 13 to the lower position as indicated by the dash lines where the arm 18 is stopped by the bumper block 32 carrying the intervening buffer spring 33 to hold the shoe 30 under the wheel.

The shoe 30 is held in engagement with the wheel tire by the yielding of the spring 28 which pemits the leg 27 to extend to let the shoe 30 follow the periphery of the wheel, and the wheel to actually roll up on the shoe and there remain. The motion of the vehicle is soon arrested by the shoe 30 frictionally engaging the roadway. All sliding is taken on the shoe 30 so that no damage is done to the wheel or tire.

To remove the shoe 30 from under the wheel 13, the lever 14 is released from its engaging notch in the quadrant and the vehicle is moved forwardly to permit the wheel 13 to roll off the shoe 30 which will follow the wheel back up and then return to its normal inoperative position through the pull of the spring 23.

The same action is obtained should the vehicle be moving forwardly, by throwing the lever 14 rearwardly to throw down the arm 17. No great force on the lever 14 is required to cause the shoes 30 to be positioned under the wheel. A light pull or push on the lever 14 until either shoe 30 contacts the wheel is all that is necessary, as the shoe 30 is then carried on around by the wheel itself and not by pulling or pushing on the lever 14.

The foregoing description has been applied to one rear wheel only. In practice, however, to avoid skidding, I provide means for operating shoes on both rear wheels, as indicated in Figs. 1 and 2, where the actuating mechanism above described is carried at the left rear wheel 13, and rods 34 and 35 fixed in the rotating centers of the arms 17 and 18 extend transversely across to the other wheel to pass through a plate 36 similar to the plate 10, and carry the arms 37 and 38 corresponding to the arms 17 and 18, which arms in turn carry the extensible legs 39 and 40 and the shoes 41.

A modification of the arm actuating mechanism is shown in Figs. 5 and 6, where, in place of the plate 10, a guide 42 carries a horizontal sliding plate 43. This plate 43 has a slot 44 in one end and a slot 45 in the other with the central dividing vertical cross-piece 46.

The pin 21 extends into the slot 44 and the pin 22 into the slot 45. The cross-piece 46 corresponds to the lever 12 in that as the rod 16 moves the slide plate 43, the cross-piece 46 will contact either pin 21 or 22 to rock the corresponding arm 17 or 18.

In Fig. 5, the slide plate 43 is shown pulled forwardly to throw the arm 17 downwardly from its normal position as indicated by the dash lines. The cross-piece 46 being ahead of the pin 22, the arm 18 is not moved, but is locked against movement as the rear end of the plate 43 comes up behind the pin 22 so that the pin 22 can not move.

I claim:

1. The combination of a wheel, an arm pivoted accentrically of the wheel to swing to the rear of the wheel, a second arm pivoted eccentrically of the wheel to swing to the front of the wheel, a leg slidingly carried by each of said two arms, yielding means resisting the outward travel of the legs, a shoe on the outer end of each leg, means normally holding said arms upwardly to maintain said shoes in positions out of contact with said wheel, selective means for dropping either of said shoes to contact the periphery of the wheel whereby the shoe actuated may frictionally engage said wheel and be carried along by the wheel, and a stop limiting the travel of the arm carrying the shoe whereby said shoe stops the rotation of the wheel when the shoe contacts the ground and carries the wheel thereon.

2. The combination of a wheel, an arm pivoted eccentrically of the wheel having a short member bearing a pin, an extension leg on one side of the pivot, a shoe carried by the leg and means connected with the arm on the other side of the pivot comprising a bar manually rocked against the pin for swinging the arm to contact the shoe with the wheel.

3. The combination of a wheel, an arm pivoted eccentrically of the wheel having a cranked member bearing a pin, a shoe adjustably secured to the arm on the other side of the pivot, means for normally holding the arm in position with the shoe out of contact with the wheel and means connected with the arm on the other side of the pivot comprising a bar manually rocked against a pin for swinging the arm to contact the shoe with the wheel.

4. The combination of a wheel, an arm having an inner cranked end pivoted eccentrically of the wheel, said end having a pin, a leg slidingly carried by the arm, yielding means resisting the outward travel of the leg, a shoe on the outer end of the leg, means normally holding the arm up with its shoe out of contact with the wheel, means for dropping the shoe into frictional contact with the periphery of the wheel comprising a rocking lever and manually operated means for rocking the lever into contact with the pin on the arm, and means limiting the travel of the arm to stop the travel of the wheel when the shoe is on the ground under the wheel.

In testimony whereof I affix my signature.

WILLIAM L. LIGHTFORD.